Nov. 22, 1955    G. A. OLIVE    2,724,803
AMPLITUDE MODULATION SYSTEMS
Filed March 13, 1953    3 Sheets-Sheet 1
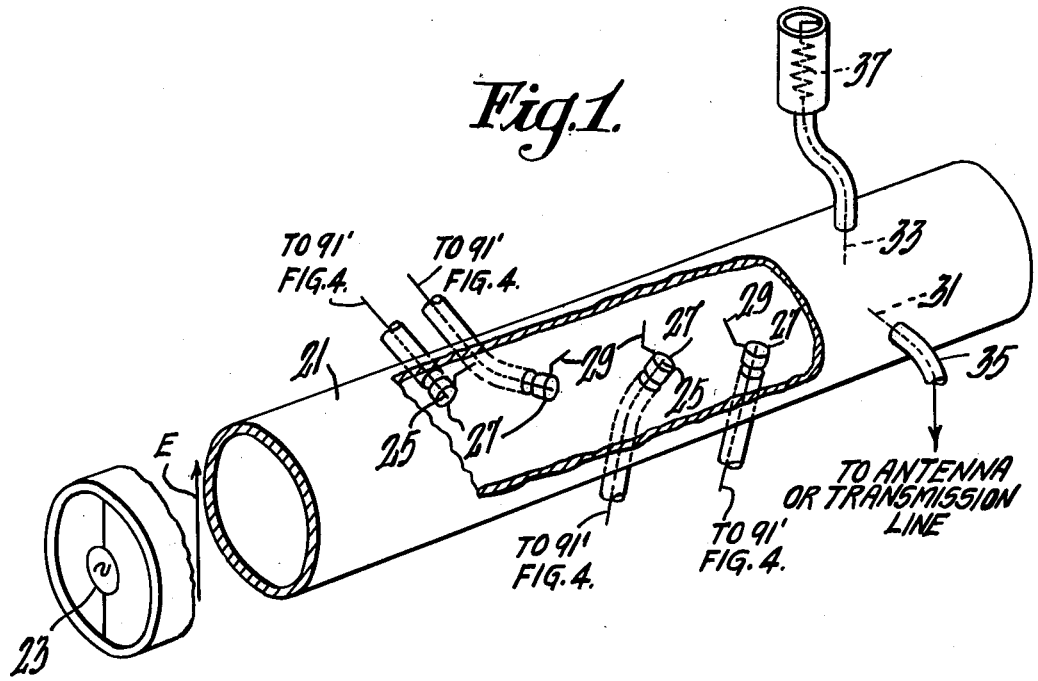
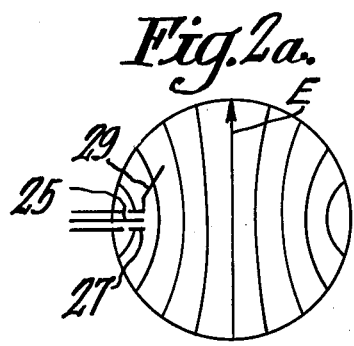
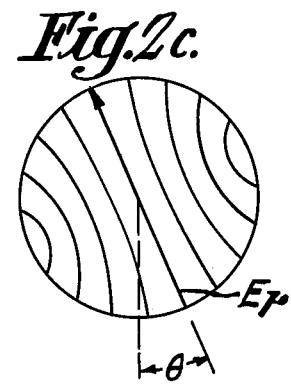
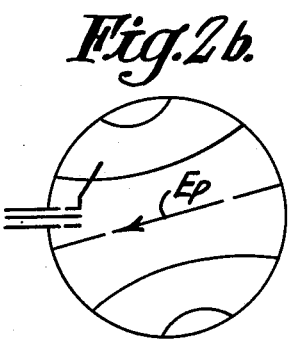
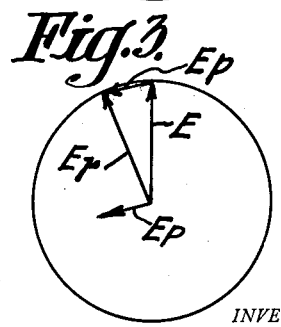
INVENTOR.
George A. Olive
BY Charles H. Brown
ATTORNEY Nov. 22, 1955  G. A. OLIVE  2,724,803
AMPLITUDE MODULATION SYSTEMS
Filed March 13, 1953  3 Sheets-Sheet 2
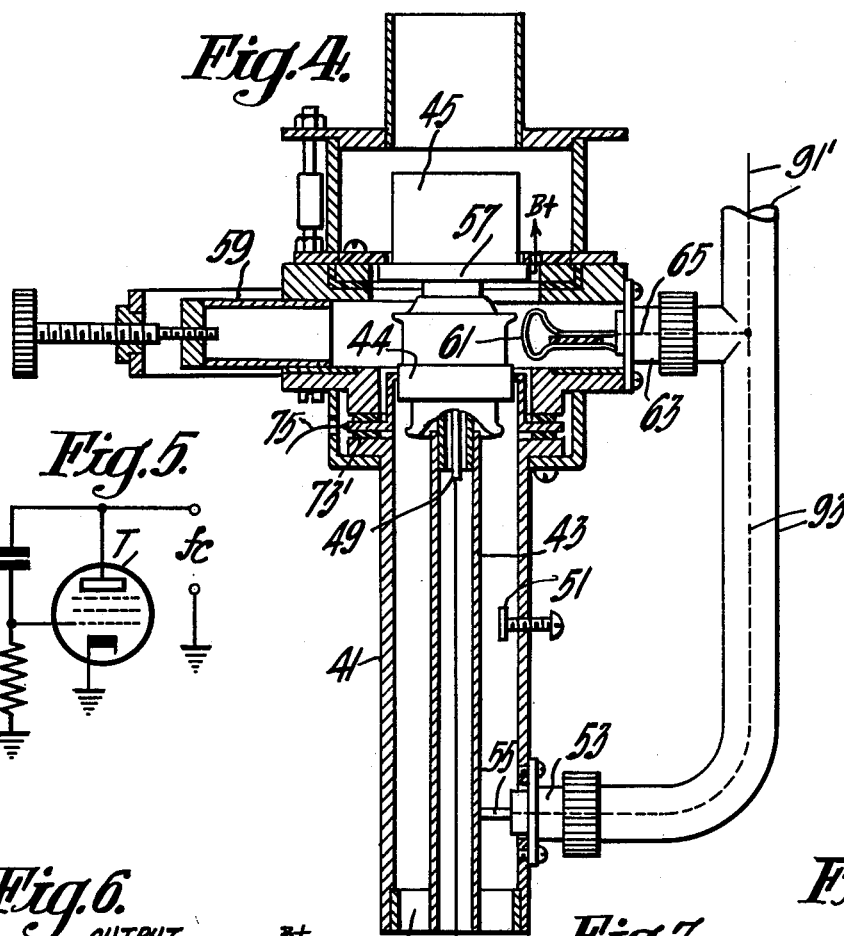
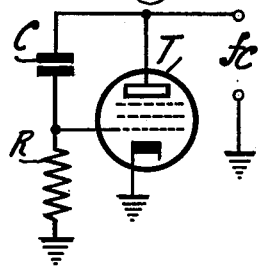
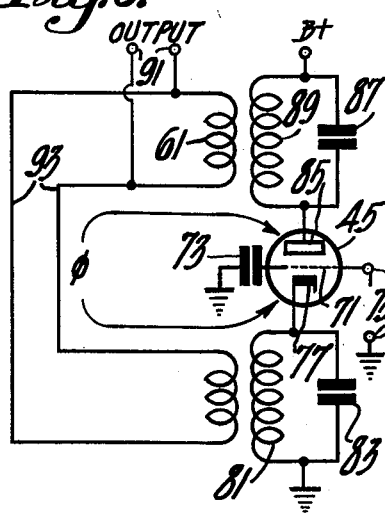
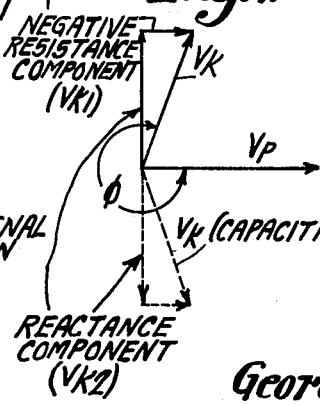
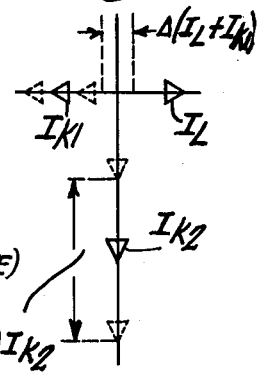
INVENTOR.
George A. Olive
BY Charles H. Brown
ATTORNEY Nov. 22, 1955 G. A. OLIVE 2,724,803
AMPLITUDE MODULATION SYSTEMS
Filed March 13, 1953 3 Sheets-Sheet 3
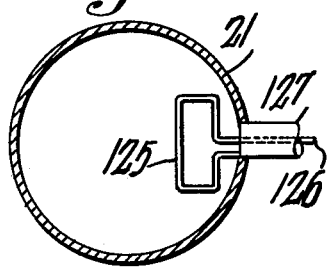
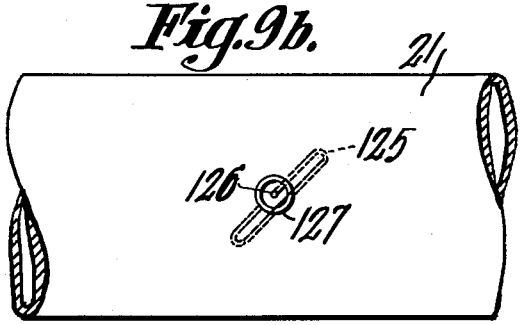
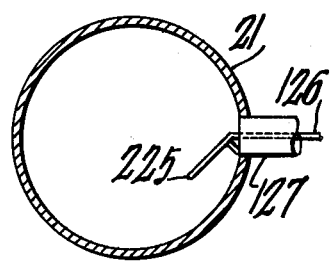
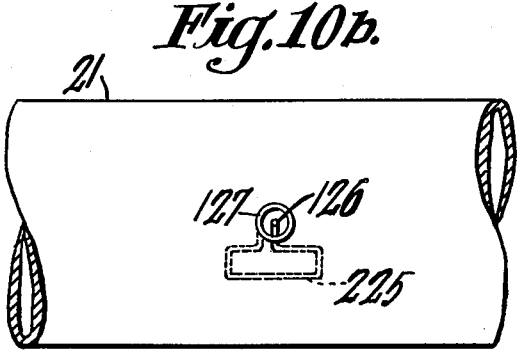
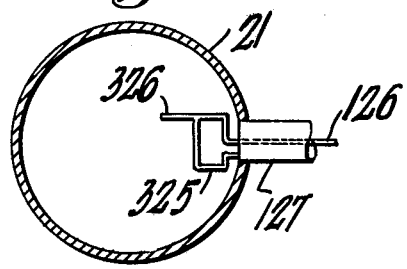
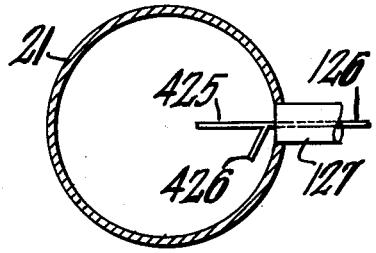
INVENTOR.
George A. Olive
BY Charles H. Brown
ATTORNEY

United States Patent Office 2,724,803
Patented Nov. 22, 1955

2,724,803
AMPLITUDE MODULATION SYSTEMS

George A. Olive, Princeton, N. J., assignor to Radio Corporation of America, a corporation of Delaware Application March 13, 1953, Serial No. 342,193

12 Claims. (Cl. 332—54)

This invention relates to absorption modulation, and particularly to modulation of very high power sources of continuous waves and is especially adapted for modulation of radio frequencies in excess of 300 megacycles.

The main application of the invention is expected to be for modulation of ultra-high-frequency radio frequency waves by signals having a wide band characteristic, such as television picture information.

Basically, the invention includes exciting a polarized wave, such as the dominant $TE_{11}$ mode in a section of waveguide. A set of polarization influencing probes extend into the waveguide in the path of propagation of the induced wave and are utilized to effect a change in the polarization of the wave propagated through the guide. This change in direction of polarization is accomplished without unduly altering the loading of the input source or changing the standing wave ratio. Each probe is coupled to a reactance circuit which includes electron discharge tubes in especially coupled cavity resonators. The reactance circuits coupled to the probes are adjusted so that with minimum or no current through the electron tube itself, the probe sees a reactance which is the same as that necessary for resonance of the probe at the carrier frequency introduced into the waveguide. As the current through the electron discharge tube is changed (as for example, by modulating energy), the reactance of the tube changes and alters the reactance seen by the probes. As this reactance changes, the probes are no longer tuned to resonance at the carrier frequency introduced into the guide, and their resonance point may, in fact, be changed an exceptionally large amount by controlling the current through the reactance tube.

The probes may enter the waveguide in a neutral plane, that is, in a plane transverse to the direction of polarization of the $TE_{11}$ wave. Inside the waveguide the probe is shaped to have a component of direction parallel to the direction of polarization of the advancing wave. The polarization-influencing probe picks up energy due to its component of direction parallel to the direction of polarization of the advancing wave. If the probe is resonant (or nearly so) at the frequency of the energy picked up by the probe, the circulating current in the probe sets up a new field in the waveguide which is at an angle with respect to the wave inducing the current in the probe. These two components of field combine in the guide to produce an apparent rotation of the $TE_{11}$ wave direction of polarization. With sufficient reactance change, this apparent rotation of the $TE_{11}$ wave can exceed 20 degrees with only one probe and its associated reactance circuit.

If the reactance seen by the probe looking toward the reactance circuit, which includes two cavity resonators and the electron discharge device, is different from that necessary for resonance of the probe and its associated circuit, a lesser circulating current is induced in the probe causing the new field set up by the probe to have lesser intensity. When this new field of lesser intensity combines in the guide with the main wave, the resultant wave in the guide is rotated a lesser amount than the case discussed above where the probe and its associated circuits are resonant.

The guide is terminated at the end remote from that at which it is excited by two couplings in space quadrature to one another. The advancing wave front excites radio frequency energy in these two couplings in proportion to the cosine of the angle between the direction of polarization of the advancing wave and the plane in which the coupling is located. One of the two couplings at the end of the guide remote from that at which the energy is introduced is coupled by a transmission line to a useful load, such as an antenna. The other coupling at the output end of the guide is connected to an absorbing load or dissipative resistor.

Energy introduced into the guide is amplitude modulated in this invention by rotating the direction of polarization of the wave in the guide in accordance with modulation imposed on the reactance circuit associated with the polarization influencing probes. At the output end, the coupling associated with the useful load picks up the energy in accordance with the degree of rotation which has been effected by the polarization influencing probes.

It is an object of this invention to provide a system of modulation for sources of continuous radio frequency power of high energy content wherein the modulation imposed on a carrier wave does not produce incidental phase and frequency modulation of the carrier wave.

Another object of this invention is to provide an improved absorption modulating system which is suitable for broad band modulating signal information, such as television picture information.

A further object of this invention is to improve reactance circuits associated with waveguides so that the change of reactance of the associated circuits does not deleteriously affect the coupling and matching of a source of input power to the waveguide.

Still another object of this invention is to improve reactance circuits associated with a waveguide to enable such circuits to influence the direction of polarization of radio frequency energy within the waveguide over an extended range and with a minimum of power required to alter the reactance of such circuits.

A still further object of this invention is to improve the efficiency of absorption modulation techniques to make them more economical of total input power and more suitable for high power applications.

A more detailed description follows in conjunction with the accompanying drawing, wherein:

Figure 1 shows a perspective view of a waveguide modulation system in accordance with the invention;

Figures 2a, 2b and 2c are diagrammatic representations of fields in the waveguide utilized in explaining the invention;

Figure 3 is a vector diagram used in explaining the invention;

Figure 4 is an elevation in section of one of the cavity resonator reactance circuits which are a part of this invention;

Figure 5 is a schematic drawing of a reactance tube circuit;

Figure 6 is an equivalent circuit diagram utilized in explaining the operation of Figure 4;

Figures 7 and 8 are vector diagrams used to explain certain principles of operation of the invention;

Figures 9a and 9b show an end view and a side view respectively of an alternative polarization influencing member which may be used in the invention;

Figures 10a and 10b show an end view and a side view respectively of another polarization influencing member utilizable in the invention; and Figures 11 and 12 show two other polarization influencing probes which may be employed in practicing the invention.

Referring now to Figure 1, there is shown a circular waveguide section 21 having a source of radio frequency energy 23 coupled thereto and adapted to excite a linear polarization, dominant wave having its electric vector E perpendicular to the axis of waveguide 21. This mode of waveguide propagation is denoted as the $TE_{11}$ mode. The $TE_{11}$ mode may be induced in the guide by any of several coupling arrangements. The source of radio frequency energy 23 may be, for example, a conventional high-frequency electron discharge device such as a triode or tetrode vacuum tube, a magnetron, a klystron, etc.

The $TE_{11}$ wave proceeds down the guide with the direction of polarization (for one instantaneous polarity of the radio frequency energy applied) as shown by the arrow. A polarization influencing probe 25 is positioned in the guide, entering in a plane transverse to the direction of polarization of the incident wave. Such a probe 25 is shown in greater detail in Figure 2a. Referring to Figure 2a, a single probe is shown with its position in a transverse plane with reference to the incident $TE_{11}$ wave. The probe 25 itself is especially shaped to have a component of direction parallel to the direction of polarization of the incident wave.

The probe 25 shown in Figure 2a enters through an aperture in the circular waveguide 21 in a direction transverse to the incident $TE_{11}$ wave. Inside the waveguide, a collar 27 surrounds the probe 25 and is in capacitive relation thereto. A probe extension 29 is electrically connected to the capacity collar 27 and has a component of direction parallel to the electric field vectors inside the waveguide 21.

Stated another way, the probe is oriented so that it will couple energy having the direction of polarization of the waves in the waveguide, and also having a direction at right angles thereto. In order for the probe to couple energy from the waveguide, and to also return energy to the waveguide with a different direction of polarization, the probe is effectively disposed with a longitudinal axis which is neither parallel to nor perpendicular to the direction of the electric field vector in the waveguide. The probe has its maximum coupling effectiveness at an acute angle with the electric field vector.

If the probe 25 and its associated reactance circuit is resonant at the frequency of the incident $TE_{11}$ wave, high currents will be induced in the probe 25. A new field is then set up in the waveguide which is in time phase but which is displaced in angular direction of polarization from the original incident $TE_{11}$ wave. The original incident $TE_{11}$ wave propagated down the waveguide 21 combines with the $TE_{11}$ field due to the currents in the probe 25 and produces a resultant $TE_{11}$ wave in which the direction of polarization is rotated through an angle. This angle of rotation depends upon the magnitude of currents in the probe (determined by the tuning of the probe and its associated reactance circuit) for a given probe shape and positioning.

Referring now again to Figure 1, a plurality of such polarization influencing probes 25 are placed down the waveguide 21 with succeeding ones of such probes entering the waveguide 21 at the proper angle so that the incident wave coming down the guide has a polarization in a direction transverse to the plane of entrance of each probe when each of the several probes 25 is resonant at the carrier frequency. Thus, the wave as it proceeds down the waveguide 21 successively induces currents in each of the probes which create fields at an angle to the incident field and these fields combine in the vicinity of each of the probes to produce a rotation of the direction of polarization of the $TE_{11}$ wave as it progresses down the guide 21.

To minimize the reflection from each of the several polarization influencing probes 25 and thereby maintain the standing wave ratio practically constant with respect to the source of radio frequency energy 23, the spacing between the polarization influencing probes 25 is made an odd multiple of a quarter wavelength in the waveguide.

Let it be assumed that with no modulating frequency applied, each of the several probes 25 is adjusted for resonance and maximum current to thereby have a resultant rotation (due to all of the probes) of a maximum angle of 90°. As the reactance associated with the several probes 25 is changed, the currents induced in the probes are smaller in magnitude, the fields due to the probes will be of lesser intensity, and the resultant rotation of the incident $TE_{11}$ wave will be very much less. The angle of rotation of the $TE_{11}$ wave through the guide is controlled, according to this invention, by changing the reactance of the probes at the carrier frequency of the applied $TE_{11}$ wave. At the end of the waveguide 21 remote from the source of $TE_{11}$ waves, there are two couplings for extracting the energy in the $TE_{11}$ wave from the waveguide. These couplings are located in space quadrature to one another. A first coupling 31 picks up energy from the waveguide in accordance with the component of such energy having a direction of polarization in the plane in which the coupling 31 is located and applies this energy to a useful load, such as a transmission line 35 or an antenna. The other coupling 33 picks up the energy in the waveguide which has a direction of polarization the same as that in which the second coupling 33 is located, and applies this energy to an absorbing or dissipating resistor 37.

With no modulating signal applied to the several probes 25, the direction of polarization of the incident $TE_{11}$ wave will be rotated, according to this example, at the maximum angle of 90°. All of the radio frequency energy will couple to the output coupling 31 associated with the useful load, and none of this energy will couple to the dissipative resistor 37 because the second output coupling probe 33 is located in space quadrature to the incident $TE_{11}$ wave and is in a neutral plane. Stated in another way, the output coupling probes 31 and 33 extract energy from the waveguide in proportion to the cosine of the angle between the particular output coupling probe and the direction of polarization of the advancing $TE_{11}$ wave. When the incident wave has a direction of polarization parallel to one of the output coupling probes, all of the energy in the field in the waveguide couples to that probe since the cosine of 0° is 1 and none of this energy couples to a probe in space quadrature since the cosine of 90° is zero.

As an additional assumption for my example, let the modulating signal being applied to each of the several probes 25 be of the type used in television picture transmission wherein the synchronizing pulses represent the maximum excursions of radio frequency carrier energy. These synchronizing signals are superimposed on a "pedestal" which represents a carrier voltage amplitude of 75% of the amplitude of such carrier at synchronizing pulse level. The blackest portions of the picture are transmitted at high energy content, from 65% to 70% of the carrier voltage level at synchronizing pulse amplitude. Shades of gray and white are then transmitted at decreasing amplitudes of carrier down to a minimum of 12½% of synchronizing pulse level.

The modulation energy is impressed on the reactance circuits associated with each of the several probes 25 to obtain the amount of rotation such that the cosine of the angle between the $TE_{11}$ wave and the output probe 31 associated with the useful load represents the percentage of the desired carrier amplitude. In my example, since synchronizing pulses represent maximum carrier output, the polarization influencing probes 25 produce a rotation necessary to alter the direction of polarization of the $TE_{11}$ wave so that it is parallel with the output probe 31. For pedestal level at 75% of maximum carrier output, the incident $TE_{11}$ wave is rotated to produce an angle of 41.4° between its direction of polarization and the output coupling probe 31. For the white portions of the picture, the wave at the output coupling will have an angle of 83.8° between its direction of polarization and the output coupling probe 31.

Reference will now be made to Figures 2a, 2b and 2c for an explanation of how the rotation of polarization takes place. As mentioned above, Figure 2a shows the probe 25, 29 in relation to the incident TE11 wave.

Figure 2b is an idealized showing of the field produced in the guide due to the current in the probe 25. The actual configuration of the field produced by the probe 25 will contain a considerable local deformation in the neighborhood of the probe which need not be taken into account for the purpose of this explanation.

To indicate that the field in Figure 2b is of lesser intensity than the TE11 wave of Figure 2a, the vector $E_p$ indicating the direction and magnitude of the electric field produced by the probe 25 is shorter than the electric vector E of the incident TE11 field of Figure 2a, and the number of field lines shown on the drawing in Figure 2b is made less. The two fields of Figures 2a and 2b combine to produce a resultant field shown in Figure 2c wherein the electric vector is labeled $E_r$ and is shown rotated through an angle $\theta$ but of the same magnitude as the incident TE11 wave.

This summation of fields in the waveguide is shown vectorially in Figure 3. The electric vector E represents the incident TE11 wave, the electric vector $E_p$ represents the resultant electric field due to the probe, and the vector labeled $E_r$ represents the resultant field due to the combination of these two components.

Referring now to Figure 4, there is shown a reactance circuit which produces a change in the reactance seen by each of the several probes 25 associated with the waveguide 21. In this reactance circuit, an electron discharge device 45 has input and output resonant cavities. The input cavity is generally coaxial in configuration, having an outer tubular wall 41 and an inner tubular wall 43. The outer tubular wall 41 is coupled to a control electrode terminal 44 of the electron discharge device 45 at one end, and at its end remote from the electron discharge device is connected by a shorting block 47 to the inner conductor 43. The inner conductor 43 is coupled to the cathode terminal 49 of the electron discharge device.

The input cavity is adjusted to resonance at the frequency of the radio frequency carrier signal to be modulated by making its length (with a shorted coaxial cavity) an odd multiple of a quarter wavelength long. With a three-quarter wavelength input cavity, the grid-cathode circuit is tuned by means of a small adjustable lumped capacity between the outer wall 41 and the inner wall 43. This small lumped capacity may be, for example, a disc or flat plate 51 whose proximity to the inner conductor 43 may be accurately adjusted, for example, by a screw thread as shown. The excitation for the input cavity is applied between the outer and inner tubular walls 41, 43 by a coaxial connection the outer conductor 53 of which is connected to the outer wall 41, and the inner conductor 55 of which is connected to the inner wall 43.

The output cavity is generally annular in configuration and is coupled between the control grid terminal 44 and an anode terminal 57. The output cavity is adjusted to resonance at the carrier frequency of the radio frequency energy applied by adjusting the penetration of one or more slugs 59 into the volume of the output cavity. The radio frequency energy is extracted from the output cavity by a coupling loop 61 which for increased efficiency may be made resonant at the carrier frequency. One side of this coupling loop goes to an outer conductor 63 of a coaxial output line while the other side of the coupling loop goes to an inner conductor 65 of the output coaxial line.

To explain the operation of the reactance circuits utilized in practicing this invention, reference will be made to a prior art reactance tube circuit as shown in Figure 5. Considering reactance tube circuits typified by the schematic diagram of Figure 5, the admittance seen looking into the terminals where the radio frequency energy $f_c$ is applied consists of the sum of three components: (1), the admittance of the plate (anode) resistance; (2), the admittance of the feed-back loop which is the admittance of the series combination of capacitance C and resistance R at the frequency $f_c$; and (3), the admittance which varies proportional to the transconductance $g_m$ of the tube T due to the signal on the control electrode.

For reactance tubes, it is desirable that this third component of admittance be large compared to the first two and also be predominantly reactive. This will be true if the following inequalities are satisfied:

$$1 \ll 1/\omega RC \ll \mu \qquad Rg_m \gg 1$$

In low frequency circuits, these requirements are met by the use of pentodes which have a high plate resistance, high transconductance and a high amplification factor ($\mu$). In low frequency circuits, the resistance R can be chosen practically at will since the control grid-to-cathode effective resistance is extremely large and offers negligible loading.

In attempting to use such reactance tube circuitry at ultra-high frequencies, certain difficulties arise. The electron transit time results in a loading effect of the input of the electron discharge tube used in the circuit. This input loading represents power lost and presents a large resistive component at the output of the reactance tube circuit. It is necessary that the admittance seen from the output circuit which is due to the signal applied to the control grid produce large components relative to the admittance of the anode circuit or the admittance of the feed-back circuit.

An ultra-high-frequency reactance circuit should, therefore, produce at the input terminals of the electron discharge device not only a voltage which produces reactive current in the anode circuit of the discharge device but one which also has a component of voltage producing a current in the anode circuit which tends to cancel the resistive current due to the input loading of the discharge device. Stated in another way, the part of the admittance of the reactance circuit which varies as the mutual transconductance of the electron discharge device should contain both a reactive part and a negative resistance part.

Since the negative resistance of an electron discharge device varies with the transconductance, it is probably not feasible to get a cancellation of the resistive component over the whole modulation range utilizing a single electron discharge device. This fact does not impose any difficulties in the use of the circuit with this modulation system however. In this invention, a reactance tube circuit has been provided in which the total resistance in the reactance tube itself varies about zero while the total reactance varies about a relatively large value. Furthermore, care must be taken that the magnitude and phase of the signal fed back is not such that free oscillations can result.

Referring now to Figure 6, a simplified schematic diagram is shown which illustrates the principles of operation of the circuit arrangement of Figure 4. An electron discharge device 45 is shown as a triode and corresponds to the vaccum tube identified with the same numeral in Figure 4. The control electrode or control grid 71 is grounded for ultra-high-frequency radio energy by the by-pass capacitor 73. Modulation to control the reactance of the circuit may also be applied to the grid 71 through input terminals 75.

The cathode 77 has a tuned circuit coupled thereto represented as a parallel connected inductance 81 and capacitance 83. This parallel circuit 81, 83 is tuned to resonance at the frequency at which the reactance is to be varied. The anode 85 also has connected thereto a parallel resonant circuit consisting of a capacitor 87 and an inductance 89. This LC circuit 87, 89 is also tuned to resonance at the ultra-high frequency at which the reactance is to be supplied. Suitable operating potential for the electron discharge device 45 is supplied from the source of potential indicated on the drawing as B+.

Energy appearing in the resonant circuit 87, 89 is extracted by the coupling loop 61. This coupling loop 61 has output terminals 91 which extend to the ultra-high-frequency device, the reactance of which is to be changed. Also from the coupling loop 61 a transmission line 93, which may be either coaxial or other two-wire line (or which may be waveguide transmission line if desired), extends to and is coupled into the resonant circuit 81, 83, forming the cathode circuit of the electron discharge tube 45. The electrical distance from the anode electrode 85 to the cathode electrode 77 of the electron discharge device 45 is determined in this invention so that the voltage appearing at the cathode has a negative resistance component, that is, one which is in phase with the instantaneous radio frequency voltage at the anode.

Reference is now made to Figure 7 which is a vector diagram of instantaneous radio frequency voltages which appear in the circuit arrangement of Figure 6. The vector $V_p$ denotes the instantaneous radio frequency voltage appearing at the anode or plate 85. The vector $V_k$ represents the instantaneous radio frequency voltage appearing at the cathode 77. This vector $V_k$ may be resolved into two components, one of which is denoted as the negative resistance component and labeled $V_{k1}$, the other of which is denoted as the reactance component and is labeled $V_{k2}$.

The length of the electrical path from the anode 85 to the cathode 77, designated $\theta$, is that which is necessary to produce the negative resistance component $V_{k1}$ in the cathode voltage which causes a resistive current to flow in the cathode-anode path of the electron discharge device in a sense necessary to cancel the loss current due to the plate resistance of the tube, the input loading and other such causes.

These currents are shown vectorially in Figure 8. The loss current which is in phase with the instantaneous plate voltage is designated as $I_L$. The current due to the negative resistance component of voltage $V_{k1}$ appearing at the cathode is labeled $I_{k1}$ and it will be noted is in opposite sense to the loss current for one value of transconductance $g_m$ in the modulation range. The vector summation of these two currents is zero for the above-mentioned value of transconductance and varies over a small range, indicated in Figure 8 as $\Delta(I_L+I_{k1})$. The reactance component of voltage $V_{k2}$ produces a current $I_{k2}$ which is reactive (inductive in this instance since it lags the plate voltage $V_p$) of considerable greater magnitude than the negative resistance current or the loss current. With the changing of the transconductance of the tube by the application of modulation to the input terminal 75 of the variable reactance circuit of Figure 6, this reactive current $I_{k2}$ varies over a relatively large range indicated on Figure 8 as $\Delta I_{k2}$.

Referring again to Figure 7, the phase relations for operating the reactance circuit to produce a variable capacitive reactance are shown by the dotted arrows $V_k$ (capacitive) with the reactance and negative resistance components also shown dotted.

The phase relations necessary for the grounded grid reactance tube circuit arrangement to operate properly at such ultra-high frequencies as are encountered in ultra-high-frequency television broadcasting are defined by the expressions:

$$\theta = 270° + \text{arc sin } \frac{V_{k1}}{V_k} \text{ (for inductive reactance)}$$

$$\theta = 90° - \text{arc sin } \frac{V_{k1}}{V_k} \text{ (for capacitive reactance)}$$

wherein $V_{k1}$ is the voltage on the cathode with respect to the grid which produces a current $I_{k1}$ in opposite sense to the loss current $I_L$ which is in phase with the instantaneous radio frequency voltage on the anode $V_p$.

Referring now again to Figure 4, a transmission line 93' is shown connected between the coaxial output line 63, 65 and the coaxial input line 53, 55. This coaxial line 93' of Figure 4 has the function and operation described in connection with the transmission line 93 of Figure 6. An output line is indicated as having terminals 91' which are electrically similar to the output terminals 91 of Figure 6 and which serve the same function.

The by-pass capacitor to effectively ground the grid of the electron discharge device for radio frequencies is formed by a dielectric spacer 73' between the grid terminal ring 44 and the body of the cavity resonator structure. The parallel resonant circuits shown in Figure 6 are the resonant cavities themselves in the showing of the mechanical embodiment of Figure 4.

In practicing the invention, variable reactance circuits like those in Figure 4 are connected to each of the several probes 25 shown in Figure 1 by a length of transmission line. The radio frequency excitation for the variable reactance circuits is picked up by the respective probes 25 in the waveguide 21. The length of the interconnecting transmission line between the respective probes 25 and the coupling loop connection 63, 65 on the reactance circuit is adjusted so that the probe, the transmission line, and the associated reactance circuit coupled thereto is resonant to carrier frequency of the source 23 which supplies the radio frequency energy to the system.

Modulation, such as an audio or video signal or broadband pulse information is applied to the grid terminal 75 of the variable reactance circuit of Figure 4 or 6. The change in the reactance of this circuit effects a change in the direction of polarization waves inside the waveguide 21 in the manner described in some detail above.

Figures 9a and 9b show end and side views respectively of a section of waveguide 21 having an alternative form of polarization influencing member positioned therein which may be substituted for the probe arrangement shown in Figures 1 and 2. The polarization influencing member of Figures 9a and 9b consists of a loop 125 having its ends connected to the inner and outer conductors of a coaxial line 126, 127, adapted to extend to a reactance circuit like that of Figure 4. An inspection of Figure 9b will show that the plane of the loop 125 is positioned at an acute angle with respect to the longitudinal axis of the waveguide 21. This position enables the loop to couple to the concomttant axial magnetic field present in the guide when a TE$_{11}$ wave is propagated therethrough. Also, the currents in the loop induce a magnetic field having a non-axial component. This induced field produces an electric field in the guide having a different direction of polarization from that of the incident energy main field, as shown in Figure 2b, which combines with the main field to produce the rotated field of Figure 2c.

In Figures 10a and 10b, there are shown end and side views respectively of a section of waveguide 21 with another form of polarization influencing loop 225 positioned therein. The two ends of the loop coupling 225 go to the inner and outer conductors respectively of the coaxial line 126, 127. The loop 225 of Figures 10a and 10b couples mainly to the concomitant tangential magnetic field inside the waveguide and the current induced in the loop effects a new field angularly disposed with respect to the inducing magnetic field. The accompanying electric field of this new field assumes an angular disposition according to the angular disposition of the loop 225 in the waveguide 21, and combines in a vector fashion with the incident wave to rotate its direction of polarization in the guide 21.

Figure 11 shows still another polarization influencing member which may be substituted for the simple probe of Figures 1 and 2. The coupling shown in Figure 11 consists of a loop 325 having a probe extension 326 thereon. For maximum coupling, the probe extension 326 may be placed parallel to the direction of polarization of the electric field. Currents induced in this probe extension 326 produce high magnitudes of current in the loop portion 325 which induce a magnetic field in a portion of the waveguide where, for this particular orientation, the magnetic field would ordinarily be zero. This new magnetic field has an accompanying electric field which is at an angle with respect to the incident $TE_{11}$ field (that is, substantially 90°). This new electric field combines with the incident field to produce the rotated field like that shown in Figures 2c and 3 above.

In Figure 12 there is shown a probe 425 which has an additional portion 426 arranged at a different direction with respect to the direction of polarization of the advancing $TE_{11}$ wave than the main probe 425. The dual-direction probe 425, 426 of Figure 12 may be oriented with the main probe in the plane of maximum electric field intensity, in which case currents in the additional portion 426 induce the electric field at an angle with respect to the incident wave to produce the rotation shown by Figures 2c and 3. Alternatively, this dual direction probe 425, 426 may be oriented with the main probe 425 in a plane at right angles to the direction of polarization of the incident wave. In this alternative orientation, the additional portion 426 of the probe couples to the incident main wave and the currents in the main probe 425 induce the electric field at an angle to the incident wave to produce the rotation.

The polarization influencing element must couple to an incident wave having its principal electric vector oriented in a predetermined direction. To shift the polarization, the element must also couple to another mode having its principal electric vector at right angles to that of the incident wave. The polarization influencing element will then pick up some energy from the incident $TE_{11}$ wave and reinsert some of this energy as another $TE_{11}$ wave whose principal electric vector has a component of polarization at right angles to that of the incident wave. Each of the polarization influencing elements of Figures 2, 9, 10, 11 and 12 has a conformation of the probe or loop inside the guide which shape has a component of direction parallel to the direction of polarization of the incident wave.

Although the invention has been explained in connection with a circular waveguide, it may be appreciated by those skilled in the art that the invention may be practiced with waveguides of other cross-sectional configurations which will support two orthogonally disposed polarized modes wherein the electric vectors are perpendicular to the axis of the waveguide.

What I claim is:

1. A modulation system comprising a hollow pipe waveguide a plurality of wavelengths long, means for exciting in said waveguide for transmission therethrough waves having a certain frequency and direction of polarization, a polarization influencing member extending into said waveguide and being oriented to couple energy having the direction of polarization of said waves and also a direction at right angles thereto, said polarization influencing member being coupled externally of said waveguide to a variable reactance circuit, said polarization influencing member together with the reactance of said reactance circuit being resonant at said frequency of said waves at one extreme value of reactance within the variable range of said reactance circuit, and two couplings in space quadrature within said waveguide in a portion of said guide on the side of said polarization influencing member opposite to said exciting means, one of said couplings being connected to a transmission line adapted to extend to a useful load device, the other of said couplings being electrically connected to a dissipative resistor.

2. In a television transmission system, a broad-band picture modulation system comprising a hollow pipe waveguide a plurality of wavelengths long, means for exciting in said waveguide for transmission therethrough waves having a certain frequency and direction of polarization, a polarization influencing probe extending into said waveguide and being oriented to couple energy having the direction of polarization of said waves and also a direction at right angles thereto, said probe being coupled externally of said waveguide to a variable reactance circuit, said probe together with the reactance of said reactance circuit being resonant at said frequency of said waves at one extreme value of reactance within the variable range of said reactance circuit, means for coupling a source of signal information to said reactance circuit to vary the reactance of said reactance circuit and thereby vary the resonance of said probe in accordance with said signal information, and two couplings in space quadrature within said waveguide in a portion of said guide on the side of said probes opposite to said exciting means, one of said couplings being connected to a transmission line adapted to extend to a useful load device, the other of said couplings being electrically connected to a dissipative resistor.

3. A modulation system comprising a hollow pipe waveguide a plurality of wavelengths long, means for exciting in said waveguide for transmission therethrough waves having a certain frequency and direction of polarization, a polarization influencing probe extending into said waveguide and oriented to be energized by said waves, said probe being coupled externally of said waveguide to a variable reactance circuit, said probe together with the reactance of said reactance circuit being resonant at frequency of said waves for one quantity of reactance within the variable range of said reactance circuit, said probe being oriented to produce a field in said waveguide having a direction of polarization different from said direction of polarization of waves impinging on said probe, the intensity of said field produced by said probe being alterable by varying the reactance of said reactance circuit, and two couplings in space quadrature within said waveguide in a portion of said guide on that side of said probes which is opposite to said exciting means, one of said couplings being connected to a transmission line adapted to extend to a useful load device, the other of said couplings being electrically connected to a dissipative resistor.

4. In a television transmitter, a broad-band picture modulation system comprising a hollow pipe waveguide a plurality of wavelengths long, means for exciting said waveguide for transmission therethrough waves having a certain frequency and direction of polarization, a polarization influencing probe extending into said waveguide and being oriented to couple energy having the direction of polarization of said waves and also a direction at right angles thereto, said probe being coupled externally of said waveguide to a variable reactance circuit, said reactance circuit including an electron discharge device having input and output cavity resonators coupled thereto, a transmission line coupled between said output and input cavity resonators having a length such that a voltage is impressed in said input resonator from said output resonator having a component in phase with the instantaneous radio frequency anode voltage, said in-phase component having the magnitude necessary to cancel the radio frequency current in phase with said instantaneous anode voltage, and means to vary the transconductance of said electron discharge to thereby alter the magnitude of said voltage impressed on said input resonator.

5. In combination, a waveguide, means for propagating in said guide electro-magnetic waves of radio frequency having a predetermined direction of polarization, probe means extending into said guide and being oriented to couple energy having said predetermined direction of polarization and also a direction at right angles thereto, variable reactance means coupled to said probe means for altering the impedance of said probe means to said impinging wave, a source of signal information coupled to said reactance means, and two couplings in space quadrature in said waveguide on the other side of said probe means from said means for propagating said waves, one of said couplings being externally connected to utilization circuit means.

6. In combination, a waveguide, means for propagating in said guide electro-magnetic waves of radio frequency having a predetermined direction of polarization, resonant probe means extending into said guide and being oriented to couple energy having said predetermined direction of polarization and also a direction at right angles thereto, variable reactance means coupled to said probe means for altering the impedance of said probe means to said impinging waves, a source of signal information coupled to said reactance means to thereby vary the resonance of said probe in accordance with said signal information, and two couplings in space quadrature in said waveguide on the side of said probe means opposite to said means for propagating said waves, one of said couplings being externally connected to utilization circuit means.

7. A modulation system comprising a hollow pipe waveguide a plurality of wavelengths long, means for exciting in said waveguide for transmission therethrough waves having a certain frequency and direction of polarization, a polarization influencing member extending into said waveguide and oriented to couple energy having said certain directions of polarization and also a direction at right angles thereto, said polarization influencing member being couple externally of said waveguide to a variable reactance circuit, said polarization influencing member together with the reactance of said reactance circuit being resonant at said certain frequency for a quantity of reactance within the variable range of said reactance circuit, said reactance circuit including an electron discharge device having input and output cavity resonators coupled thereto, a transmission line coupled between said output and input cavity resonators having a length such that a voltage is impressed in said input resonator from said output resonator having a component in phase with the instantaneous radio frequency anode voltage, said in-phase component having the magnitude necessary to cancel the radio frequency current in phase with said instantaneous anode voltage.

8. A modulation system comprising, a hollow pipe waveguide a plurality of wavelengths long, means for exciting in said waveguide for transmission therethru waves having a certain frequency and direction of polarization, a polarization influencing member extending into said waveguide, a variable reactance circuit external of said waveguide and coupled to said polarization influencing member, and two output couplings in space quadrature in said waveguide on the side of said polarization influencing member opposite from said exciting means.

9. A modulation system as defined in claim 8, wherein said polarization influencing member is oriented in said waveguide to be energized by said waves and to radiate energy having a different direction of polarization into said waveguide.

10. A modulation system as defined in claim 9, and in addition, means to apply a modulating signal to said variable reactance circuit to vary the tuning of said member, whereby varying amounts of energy are absorbed and returned by said member to cause a varying rotation of the polarization of said waves.

11. A modulation system as defined in claim 10, and additional polarization influencing members spaced a quarter-wavelength along said waveguide, additional variable reactance circuits coupled to respective members, and means to apply said modulating signal to all of said reactance circuits.

12. A modulation system as defined in claim 10, wherein said variable reactance circuit comprises a reactance tube circuit.

References Cited in the file of this patent
UNITED STATES PATENTS

| | | |
|---|---|---|
| 2,438,768 | Stewart | Mar. 30, 1948 |
| 2,450,445 | Rosencrans | Oct. 5, 1948 |
| 2,458,579 | Feldman | Jan. 11, 1949 |
| 2,514,679 | Southworth | July 11, 1950 |